United States Patent [19]

Wahlberg

[11] 4,246,018

[45] Jan. 20, 1981

[54] PROCESS FOR THE PRODUCTION OF A FERTILIZER FROM BARK

[75] Inventor: Arvo O. Wahlberg, Turku, Finland

[73] Assignee: Arex Oy, Helsinki, Finland

[21] Appl. No.: 27,096

[22] Filed: Apr. 4, 1979

[30] Foreign Application Priority Data

Apr. 11, 1978 [FI] Finland .................................. 781101

[51] Int. Cl.³ .............................................. C05F 11/00
[52] U.S. Cl. ......................................... 71/23; 71/26; 71/28; 71/33; 71/8
[58] Field of Search .............. 71/23, 26, 28, 29, 64 G, 71/6, 25, 8, 33

[56] References Cited

U.S. PATENT DOCUMENTS

| | | | |
|---|---|---|---|
| 377,084 | 1/1888 | Murray ................................ | 71/26 X |
| 1,411,088 | 3/1922 | Guy ....................................... | 71/6 |
| 3,561,943 | 2/1971 | Gay et al. ............................ | 71/23 X |
| 3,561,944 | 2/1971 | Battistoni et al. ..................... | 71/26 |
| 3,645,714 | 2/1972 | Heming et al. ................. | 71/64 G X |
| 3,940,257 | 2/1976 | Sherwin et al. ......................... | 71/23 |
| 3,983,255 | 9/1976 | Bass ..................................... | 71/23 X |

*Primary Examiner*—S. Leon Bashore
*Assistant Examiner*—Ferris H. Lander

[57] ABSTRACT

The production of a fertilizer from tree bark is improved by a process of the type wherein crushed waste bark is treated together with waste molasses under elevated pressure and at a temperature of 75° to 140° C. for a time of 10 min. to 2 hrs. said time being dependent on the treatment temperature, and wherein the improvement comprises adding of yeast to the waste molasses, and maintaining its temperature at 30° to 40° C. for 35 to 45 hours, whereby its pH value decreases to 3-4, before it is mixed with the ground waste bark.

4 Claims, No Drawings

PROCESS FOR THE PRODUCTION OF A FERTILIZER FROM BARK

BACKGROUND OF THE INVENTION

1. Field of the Invention

The present invention relates to a process for producing a fertilizer from free bark, and particularly to a process which is an improvement on that disclosed in Finnish Patent No. 44,124.

2. Description of the Prior Art

Bark has been used for fuel and land improvement. In the latter purpose bark has, for example, been composted using bacteria which decompose the bark in a few months. In this case, however, the elimination of the nitrogen makes the composted residue unusable for fertilizer. Some ten years ago a process was developed, protected by Finnish Pat. No. 44,124, whereby plant poisons present in bark could be removed from it and nitrogen and other mineral nutrients were not eliminated.

Waste bark treated by this process is very suitable for fertilizer. In the process in question, crushed waste bark, stored in piles, is cooked for some time together with waste molasses from the sugar industry.

In this case also, the nutrients present in the lignin become soluble to such an extent that plants are able to use them.

Said process has, however, one disadvantage in that the cooking process incorporated in it makes it unsuitable for continuous production. Furthermore, a more complete decomposition of the nutrients present in the lignin would tend to further improve the availability of the respective nutrients to plants.

Thus, it is an object of the invention to achieve an improvement over the known process and to overcome the disadvantage mentioned above.

SUMMARY OF THE INVENTION

The present invention provides an improved process for the production of a fertilizer from tree bark, wherein crushed waste bark is treated together with waste molasses under elevated pressure and at an elevated temperature of 75° to 140° C. for 2 hours to 10 minutes, the period being dependent on the treatment temperature, and wherein the improvement comprises adding of yeast to the waste molasses and maintaining its temperature at 30°-40° C. for 35-40 hours, whereby its pH value is lowered to 3-4, before it is mixed with ground waste bark.

It has been observed that the pH value of waste molasses is rather critical in order to obtain the best fertilizer possible. Advantageous condition and pH value are achieved according to the present invention.

DESCRIPTION OF THE PREFERRED EMBODIMENTS

The fertilizer is produced as follows:

Waste bark is crushed in, for example, a crushing mill and then mixed with waste molasses; the pH value of the molasses, which is normally about 7.5, is decreased to about 3.5 before mixing. Thereafter the mixture is fed into a furnace in which the temperature is 75°-140° C. and the treatment period is 10 min. to 2 hrs., depending on the temperature. The optimum temperature is 120°-130° C., in which case the treatment period is 20-10 min. Thereafter the mixture is allowed to cool.

In connection with the grinding of the waste bark it is possible to add to it, if so desired, various plant nutrients such as urea, superphosphate and potassium salts. It must be noted, however, that in connection with the addition of urea the treatment temperature must not rise above 160° C. under any circumstances because in that case poisonous substances which can be lethal are produced.

In the pretreatment the molasses is heated to about 30°-40° C. and yeast is added to it at a rate of about 400 g/m$^3$. This pulp is maintained at 30° C. for 35-45 hours, preferably 42 hours. In this case the so-called free sugar present in the molasses begins to ferment, and its pH drops to about 3-4.

The following ratios are given as examples:

Molasses is added at a rate of 6 kg/m$^3$ to about 1.5 m$^3$ of waste bark pulp which, when ground, shrinks to about 1 m$^3$; in order to achieve fermentation and to lower the pH value the molasses contains yeast up to a maximum of 400 g/m$^3$. To each m$^3$ of waste bark additives can be added in the following quantities, for example: urea about 5 kg, phosphorus about 5 kg, and potassium salts about 3 kg.

What is claimed is:

1. In a process for the production of a fertilizer from tree bark, wherein a mixture of comminuted waste bark and waste molasses are subjected to heating under an elevated pressure and at a temperature of from about 75° to 140° C. for a period of from about 10 minutes to 2 hours, the improvement comprising pretreating the waste molasses by adding yeast thereto and heating the same at a temperature of from about 30° to 40° C. for a period sufficient to lower the pH to from about 3 to 4, and thereafter mixing the so pretreated molasses with said waste bark.

2. A process according to claim 1, wherein the period of pretreatment of the molasses and yeast is from about 35 to 45 hours.

3. A process according to claim 1 or claim 2, wherein the yeast is added to the waste molasses in an amount of up to 400 g/m$^3$ of said molasses.

4. A process according to claim 1, wherein said bark and pretreated molasses are heated at a temperature of from about 120° to 130° C. for a period of from about 10 to 20 minutes.

* * * * *